United States Patent [19]

Takahashi

[11] Patent Number: 5,050,950
[45] Date of Patent: Sep. 24, 1991

[54] OPTICAL MULTIPLEXING/DEMULTIPLEXING DEVICE OF VARIABLE COUPLING TYPE

[75] Inventor: Mitsuo Takahashi, Matsudo, Japan

[73] Assignee: Seikoh Giken Co., Ltd., Matsudo, Japan

[21] Appl. No.: 534,263

[22] Filed: Jun. 7, 1990

[30] Foreign Application Priority Data

Jan. 26, 1990 [JP] Japan ................................. 2-16973

[51] Int. Cl.$^5$ .............................................. G02B 6/28
[52] U.S. Cl. ...................................... 385/24; 385/15; 359/115
[58] Field of Search .......................... 350/96.15, 96.16; 370/1, 3

[56] References Cited

U.S. PATENT DOCUMENTS

| 4,461,536 | 7/1984 | Shaw et al. | 350/96.15 |
| 4,493,528 | 1/1985 | Shaw et al. | 350/96.15 |
| 4,556,279 | 12/1985 | Shaw et al. | 350/96.15 |

OTHER PUBLICATIONS

Yamamoto et al., "A Large-Tolerant Single-Mode Optical Fiber Coupler ...", *Proc. of IEEE*, Jun. 1976, pp. 1013-1014.

Kobayashi et al., "Optical Demultiplexer Using Coupling...", *Applied Optics*, vol. 17, No. 20, Oct. 1978, pp. 3253-3258.

*Primary Examiner*—John D. Lee
*Attorney, Agent, or Firm*—Spencer & Frank

[57] ABSTRACT

An optical multiplexer of the variable coupling type for branching an input signal from a first optical fiber to a second fiber at a given ratio. The optical multiplexer is made of a pair of substrates, each having a side defining a reference plane and a face perpendicular to the reference plane. The respective perpendicular faces each have a V-groove disposed at an angle greater than zero and less than 5° to the reference plane. The first and second optical fibers are positioned in the respective V-grooves. Each of the faces of the substrates with the optical fibers in the V-grooves are abraded until the cores of the optical fibers are just exposed. The substrates are assembled to contact each other at the respective faces such that the exposed cores of the optical fibers face each other and are separated by a distance defining the ratio of branching of the input signal.

6 Claims, 3 Drawing Sheets

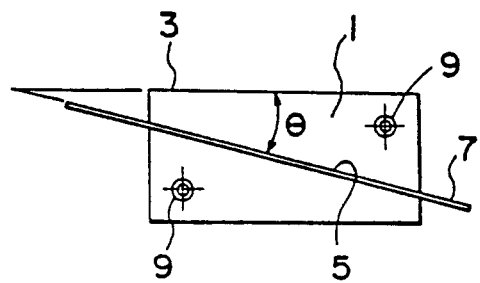 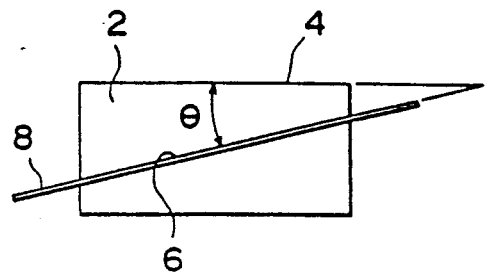
FIG. 1(A)  FIG. 1(B)
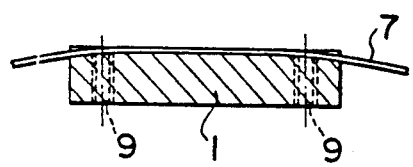 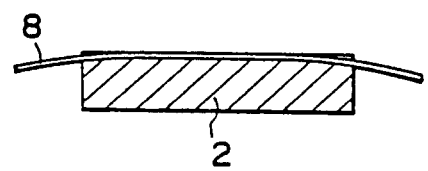
FIG. 1(C)  FIG. 1(D)
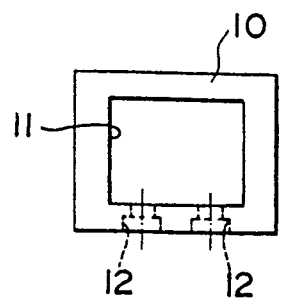 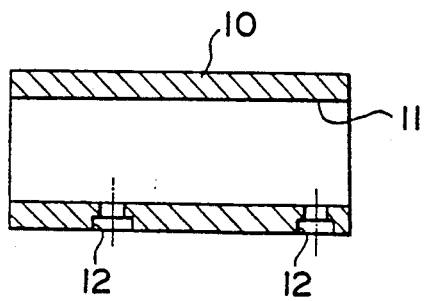
FIG. 2(A)  FIG. 2(B)

OPTICAL MULTIPLEXING/DEMULTIPLEXING DEVICE OF VARIABLE COUPLING TYPE

BACKGROUND OF THE INVENTION

The present invention relates to an optical multiplexing/demultiplexing device to multiplex or demultiplex an optical signal passing through optical fiber communication circuits, and especially to an optical multiplexing/demultiplexing device of the variable coupling type where an attenuated optical signal whose attenuation is variable can be output at its optical output port through its branch circuit.

Optical multiplexing/demultiplexing devices of the variable coupling type, which are used to multiplex or demultiplex optical signals in an optical fiber communication circuits, are conventionally those which are made of optical fibers scrubbed as shown in FIGS. 5(a) and (b).

FIG. 5(a) shows a cross-sectional view of the optical multiplexing/demultiplexing device cut across the optical axes of the built-in optical fibers, which is made of optical fibers scrubbed in accordance with techniques known by the person skilled in the art.

FIG. 5(b) shows a cross-sectional view of the optical multiplexing/demultiplexing device cut along the optical axes of the built-in optical fibers, which is made of optical fibers scrubbed in accordance with techniques known by the person skilled in the art.

The configuration of the conventional optical multiplexing/demultiplexing device will be explained to make the problems of this type of device clear.

V-grooves 23 and 24 are arranged on the inner surfaces of a pair of substrates 21 and 22 so that they can mate with each other at the centers of the pair of substrates 21 and 22, respectively. Optical fibers 25 and 26 are arranged within V-grooves 23 and 24 and are fastened thereby adhesives. Thereafter, the clads 29 and 30 of the optical fibers 25 and 26 are scrubbed off along the optical axes thereof together with the substrates 21 and 22 until cores 27 and 28 of the optical fibers 25 and 26 are just exposed. The scrubbed surfaces of the optical fibers 25 and 26 are contacted to make them mate with each other.

This configuration permits the optical power passing through one of the optical fibers to move to the other at a predetermined ratio in accordance with the evanescent effect.

It is well known by the person skilled in the art that the ratio of the optical power passing through a first optical fiber to that moved to a second optical fiber can easily be changed by finely adjusting the distance S between the core of the first optical fiber and that of the second optical fiber.

The means for changing the ratio of the optical power branching from the first optical fiber into the second optical fiber when the optical power is incident on the first optical fiber can be explained referring to FIG. 5(a). The conventional multiplexing/demultiplexing device of a variable coupling type is, as an example, such that substrate 22 is continuously shifted by means of a micrometer (not shown) with respect to substrate 21 in a direction perpendicular to the optical fiber axes so that the distance S from fiber core 27 to fiber core 28 can be finely adjusted.

Unless the guide for shifting substrate 22 works correctly, substrate 22 may move in a zigzag fashion. Thus it is very difficult for the operator to continuously move substrate 22 while keeping the pair of optical fibers precisely in parallel.

Assume that the scrubbed surfaces of the optical fibers are approximately 5 mm in length along the optical axes when SM10/125 single-mode optical fibers are used in the assembly, and that distance S measured from one of the optical fibers to the other is 12 μm. We define the optical power branch ratio as the ratio of the optical power branching from the first optical fiber into the second optical fiber when the optical power is incident on the first optical fiber. The shift of distance from one of the optical fibers to the other is approximately 12 μm so as to change the optical power branch ratio from 50-to-50 to 90-to-10. Thus, any zigzag motion is to be avoided as far as possible because it causes errors in the optical power branch ratio.

The guide should be precise and is elastic, and it is difficult to fabricate a guide of small size at low cost.

The objective of this invention is to provide a multiplexing/demultiplexing device of the variable coupling type which can be built to be compact at low cost, and wherein the optical power branch ratio is arbitrarily adjustable.

SUMMARY OF THE INVENTION

This invention provides a multiplexing/demultiplexing device of the variable coupling type wherein a pair of substrates having a pair of surfaces along the length thereof are used as reference planes, a pair of V-grooves are arranged on another plane perpendicular to the reference plane along the length thereof at an inclination angle of five degrees or below with respect to the reference planes, a pair of optical fibers are put into the grooves, the clads of the optical fibers are scrubbed together with the substrates until the cores of the optical fibers are just exposed, and the pair of substrates are aligned in parallel with each other so that the optical power incident on one of the pair of optical fibers branches into the other optical fiber from which the optical power can be output.

The present invention also provides a multiplexing/demultiplexing device of the variable coupling type wherein a guide with a through-hole having a rectangular cross-section is provided to fasten one of the pair of substrates therein to form a fixed substrate, and to insert the other substrate into the through-hole so as to form a movable substrate, thereby shifting the movable substrate in parallel to the reference planes relative to the fixed substrate in the through-hole so that the distance from the core of one optical fiber in the fixed substrate to that of the other optical fiber in the movable substrate can be changed.

BRIEF DESCRIPTION OF THE DRAWINGS

FIGS. 1(a) and 1(b) show front views and FIGS. 1(c) and 1(d) show cross-sectional views of an embodiment of the substrates used to construct the optical multiplexing/demultiplexing device of the variable coupling type in accordance with the present invention, respectively.

FIGS. 2(a) and 2(b) show a front view and a cross-sectional view of an embodiment of the guide used to construct the optical multiplexing/demultiplexing device of the variable coupling type in accordance with the present invention, respectively.

FIG. 5(a) shows a cross-sectional view cut across the axes of the optical fibers. FIG. 5(b) shows a cross-sectional view cut along the axes of the optical fibers.

DESCRIPTION OF THE PREFERRED EMBODIMENT

Figure 3A:
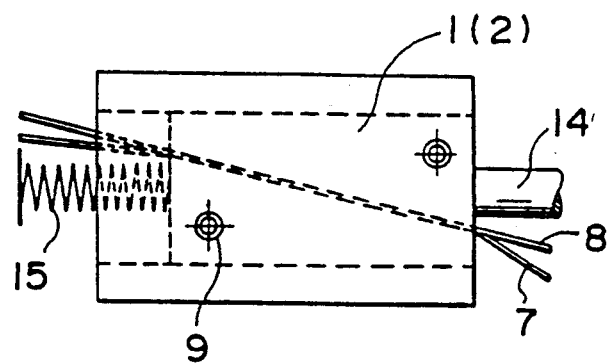
FIGS. 3(a) and 3(b) show a front view and a cross-sectional view of an embodiment of the assembly of the optical multiplexing/demultiplexing device of the variable coupling type built in accordance with the invention, respectively.

The present invention will be described in detail referring to the drawings.

The multiplexing/demultiplexing device of the variable coupling type built in accordance with the present invention consists of a pair of substrates and a guide.

FIGS. 1(a) and 1(b) show front views and FIGS. 1(c) and 1(d) cross-sectional views of a pair of substrates used to form the multiplexing/demultiplexing device of the variable coupling type in accordance with the present invention, respectively.

V-grooves 5 and 6 are provided on the surfaces of substrates 1 and 2 so that V-grooves 5 and 6 are set at an inclination angle $\theta$ of five degrees or less with respect to reference plane 3 and 4, respectively. These V-grooves 5 and 6 are arranged at such locations that they can mate with each other when substrates 1 and 2 are attached to make an assembly. Optical fibers 7 and 8 are housed in V-grooves 5 and 6 and then fastened there.

The surfaces of substrates 1 and 2, whereon optical fibers 7 and 8 are mounted and fastened, are scrubbed together with the clads of optical fibers 7 and 8 in such a manner that substrates 1 and 2 and the clads can be removed along their surfaces until the cores of optical fibers 7 and 8 are just exposed. Thereafter, the surfaces of substrates 1 and 2 are attached so that optical fiber 7 can contact optical fiber 8, and then they are assembled.

A pair of tapped holes 9 are provided at symmetrical locations throughout the substrate 1.

FIGS. 2(a) and 2(b) show a front view and a cross-sectional view of a guide 10, respectively.

Guide 10 provides through-hole 11 of rectangular shape and a pair of holes are bored for a pair of set-screws 12 at the bottom of guide 10. Through-hole 11 is precisely finished so that no play can occur between guide 10 and the assembly of substrates 1 and 2 when the assembly is inserted into the through-hole 11.

Figure 3B:
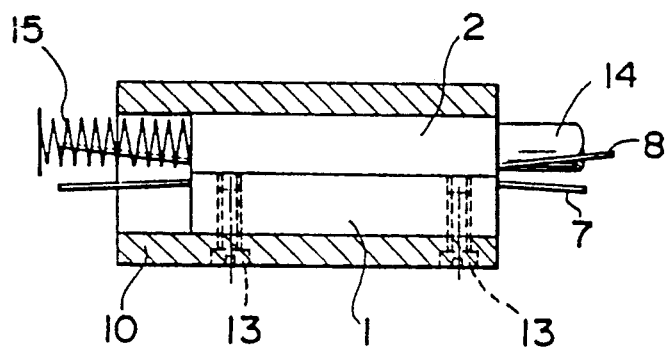

FIGS. 3(a) and 3(b) show front and cross-sectional views respectively of the optical multiplexing/demultiplexing device of the variable coupling type, where the assembly of substrates 1 and 2 is inserted into the guide 10, respectively.

Substrates 1 and 2, which are assembled so that optical fibers 7 and 8 in FIGS. 1(a) and 1(b) can contact each other when substrates 1 and 2 are assembled together, are inserted into through-hole 11 of guide 10. Substrate 1 is fastened to guide 10 by setscrews 13, and substrate 2 is left movable along through-hole 11 of guide 10.

Spindle 14 of a micrometer (not shown) contacts movable substrate 2 at one end thereof, and coil spring 15 pushes movable substrate 2 toward spindle 14. These components can be assembled in various ways. FIG. 3(a) and 3(b) show that optical fiber 7 is mating with optical fiber 8 in position.

Figure 4A:
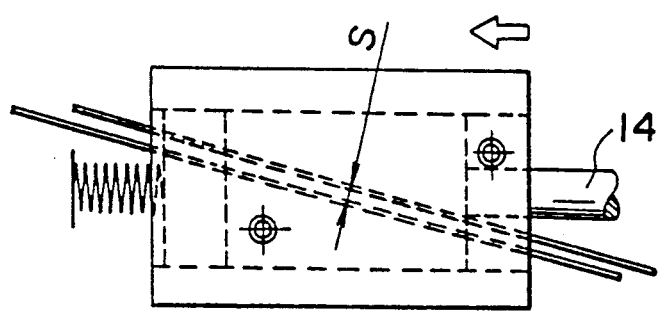
FIGS. 4(a) and 4(b) show a front view and a cross-sectional view of the assembly wherein a micrometer spindle is shifted by "D" toward the arrow so as to move the movable substrate.
Figure 4B:
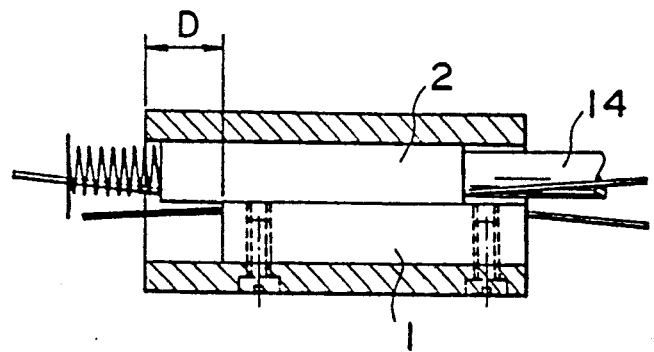
Figure 5A:
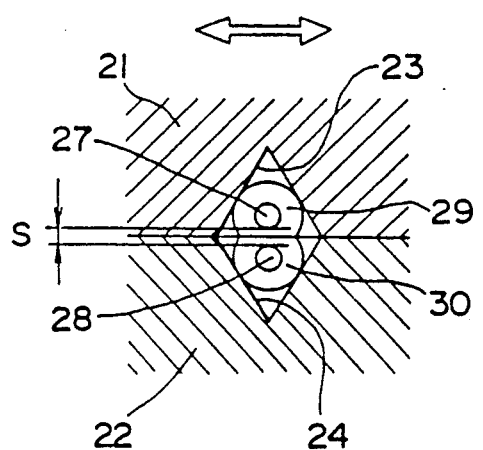
FIGS. 5(a) and 5(b) show cross-sectional views of means to change the ratio of multiplexing/demultiplexing for the conventional optical multiplexing/demultiplexing device of the variable coupling type.
Figure 5B:
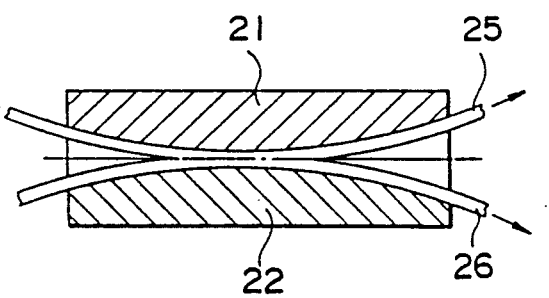

FIGS. 4(a) and 4(b) show front and cross-sectional views, respectively, of the optical multiplexing/demultiplexing device wherein the optical power branch ratio is other than unity. Movable substrate 2 shifts along the axis of the through-hole 11 (as indicated by an arrow) by distance D due to the motion of spindle 14 of the micrometer (not shown). The distance S from optical fiber 7 to optical fiber 8 is given by $$S = D \tan \theta,$$

where $\theta$ is the inclination angle of the optical fibers with respect to reference surface 4 of substrate 2.

As described above, the optical multiplexing/demultiplexing device of the variable coupling type built in accordance with the present invention consists of a pair of substrates, on the surfaces of which a pair of optical fibers are housed in a pair of V-grooves so that the optical fibers are set at an inclination angle of five degrees or below with respect to the reference plane of the substrates; and a guide, through which a through-hole is bored so that an assembly consisting of the pair of substrates whose scrubbed surfaces are attached in such a manner that one of the optical fibers mounted on the substrates can mate with the other and so that one of the pair of substrates is fastened thereto and the other is movable along the axis of the through-hole thereof in such a manner that the distance between the optical fibers can be adjusted by shifting the movable substrate along the axis of the through-hole having a length which is sufficient to move the movable substrate to such an extent that the specified quantity of optical power attenuation can be obtained.

When the movable substrate is shifted along the through-hole of the guide, it moves more smoothly, without any significant zigzag motion along the axes of the cores of the optical fibers, than that in the conventional version wherein the movable substrate moves at right angle with respect to the axes of the optical fibers. An optical multiplexer/demultiplexer in accordance with the present invention can precisely be set at an arbitrary quantity of attenuation keeping the optical fibers in parallel with each other.

In a conventional device wherein the substrate can be moved at right angle with respect to the axis of the optical fiber, the micrometer spindle is required to be shifted by 5 $\mu$m for moving the substrate by 5 $\mu$m. Since the shifting of the micrometer spindle knob directly corresponds to the motion of the substrate, fine adjustment of the attenuation is impossible in the conventional version.

The optical multiplexing/demultiplexing device built in accordance with the present invention consists of a pair of substrates having optical fibers installed in the V-grooves thereof set at an inclination angle of five degrees or below with respect to the reference plane of the movable substrate and adjusting means used to properly set the distance between the cores of a pair of optical fibers so that the optical fiber shifts parallel to the reference plane of the movable substrate. If the inclination angle is set at 0.5 degree for fastening the optical fibers to the V-grooves of the substrates, the shift of the movable substrate along the reference plane of the movable substrate within the guide is approximately 572 $\mu$m for increasing or decreasing the distance between these optical fibers by a factor of 5 $\mu$m. The ratio of 572 μm to 5 μm is more than 100 to 1. Thus fine adjustment of the distance between these optical fibers is easy.

The optical multiplexing/demultiplexing device of. The variable coupling type can thus be built to be compact and reliable with improved anti-shock/vibration performance.

What is claimed is:

1. An optical multiplexing/demultiplexing device of the variable coupling type containing a pair of rectangular substrates, each consisting of:
   a reference plane along the length thereof, and
   a pair of V-grooves arranged in a plane perpendicular to the reference plane at an inclination angle of five degrees or below with respect to the reference plane;
   wherein a pair of first and second optical fibers are installed in the pair of V-grooves, the clads of the pair of optical fibers are scrubbed together with the surfaces of the substrates providing the V-grooves thereon until the cores of the optical fibers are just exposed, and the pair of substrates are attached facing the scrubbed surfaces together to make an assembly, the positions of the pair of substrates being changeable relative to each other in the lengthwise direction of the substrates, whereby the optical power incident on an input port which goes to said first optical fiber can be adjusted to appear at an output port which goes to said second optical fiber.

2. An optical multiplexing/demultiplexing device as claimed in claim 1 which further comprises a guide having a rectangular through-hole along an axis thereof for receiving said pair of substrates, said guide surrounding said pair of substrates so that said first and second optical fibers mate with each other within said guide, one of the pair of substrates being fastened to said guide to form a fixed substrate, and the other of the pair of substrates being movable along the axis of said guide to form a movable substrate, the distance between the cores of the first and second optical fibers installed in the fixed and movable substrates being changed by moving the movable substrate along the axis of said guide within the through hole.

3. An optical multiplexing/demultiplexing device as claimed in claim 2 which further comprises a compression spring contacting one end of said movable substrate and a spindle contacting the other end of said movable substrate, displacement of said spindle moving said movable substrate within said through-hole in a direction parallel to the axis of said guide.

4. An optical multiplexing/demultiplexing device as claimed in claim 2, wherein said fixed substrate is fixed to said guide with at-least one setscrew.

5. An optical multiplexer for coupling input power from a first optical fiber to a second optical fiber, each of said optical fibers having a core and a cladding region surrounding the core, said optical multiplexer comprising
   first and second substrates having a common side defining a reference plane, and respective first and second contiguous parallel surfaces extending perpendicular to said reference plane, said first and second contiguous surfaces including respective first and second parallel linear V-shaped grooves therein, said first and second grooves extending along said first and second surfaces at an angle greater than zero degrees and not more than 5 degrees with respect to said reference plane, said grooves receiving portions of said first and second optical fibers respectively from which the cladding has been removed; and
   means for translating said first substrate with respect to said second substrate in a direction parallel to said reference plane, whereby the spacing between said first and second optical fibers is changed to control the amount of power transferred from said first optical fiber to said second optical fiber.

6. An optical multiplexer as defined in claim 5, further comprising a guide having a through-hole along an axis thereof, said first and second substrates being disposed within said through-hole, one of said substrates being fixed to said guide and the other substrate being moveable with respect to said fixed substrate, the distance between the cores of said first and second optical fibers being adjustable by moving the movable substrate within said guide in a direction parallel to the axis thereof.

* * * * *